US012589363B2

(12) United States Patent
Ho et al.

(10) Patent No.: US 12,589,363 B2
(45) Date of Patent: Mar. 31, 2026

(54) CROSSLINKED FACILITATED TRANSPORT MEMBRANE FOR HYDROGEN PURIFICATION FROM COAL-DERIVED SYNGAS

(71) Applicant: Ohio State Innovation Foundation, Columbus, OH (US)

(72) Inventors: W.S. Winston Ho, Columbus, OH (US); Yang Han, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 502 days.

(21) Appl. No.: 17/926,471

(22) PCT Filed: Mar. 18, 2021

(86) PCT No.: PCT/US2021/023031
§ 371 (c)(1),
(2) Date: Nov. 18, 2022

(87) PCT Pub. No.: WO2021/236220
PCT Pub. Date: Nov. 25, 2021

(65) Prior Publication Data

US 2023/0182089 A1 Jun. 15, 2023

Related U.S. Application Data

(60) Provisional application No. 63/026,627, filed on May 18, 2020.

(51) Int. Cl.
*B01D 53/22* (2006.01)
*B01D 67/00* (2006.01)
(Continued)

(52) U.S. Cl.
CPC ......... *B01D 69/148* (2013.01); *B01D 53/228* (2013.01); *B01D 67/00793* (2022.08);
(Continued)

(58) Field of Classification Search
CPC ............ B01D 69/148; B01D 67/00793; B01D 71/381; B01D 71/5211; B01D 71/701;
(Continued)

(56) References Cited

U.S. PATENT DOCUMENTS 6,508,860 B1 * 1/2003 Kulkarni .......... B01D 67/00791 96/14
9,233,343 B2 * 1/2016 Kim .................... B01D 71/301
(Continued)

FOREIGN PATENT DOCUMENTS

WO 2019/028280 A1 2/2019
WO 2020/087067 A1 4/2020
WO 2021/041581 A1 3/2021

OTHER PUBLICATIONS

International Searching Authority (ISA/US). International Search Report and Written Opinion. PCT Application No. PCT/US2021/023031. Issued on May 20, 2021. 11 pages.
(Continued)

*Primary Examiner* — Anthony Shumate
(74) *Attorney, Agent, or Firm* — Meunier Carlin & Curfman LLC

(57) ABSTRACT

Membranes, methods of making the membranes, and methods of using the membranes are described herein. The membrane can include a support layer, and a selective polymer layer disposed on the support layer. The selective polymer layer can include a selective polymer matrix (e.g., hydrophilic polymer, a cross-linking agent, an amino compound, a $CO_2$-philic ether, or a combination thereof), and optionally graphene oxide dispersed within the selective polymer matrix. The membranes can be used to separate carbon dioxide from hydrogen. Also provided are methods of purifying syngas using the membranes described herein.

19 Claims, 6 Drawing Sheets

(51) Int. Cl.

| | |
|---|---|
| ***B01D 69/14*** | (2006.01) |
| ***B01D 71/02*** | (2006.01) |
| ***B01D 71/38*** | (2006.01) |
| ***B01D 71/52*** | (2006.01) |
| ***B01D 71/70*** | (2006.01) |

(52) U.S. Cl.
CPC ........ *B01D 71/0211* (2022.08); *B01D 71/381* (2022.08); *B01D 71/383* (2022.08); *B01D 71/5211* (2022.08); *B01D 71/5222* (2022.08); *B01D 71/5223* (2022.08); *B01D 71/701* (2022.08)

(58) Field of Classification Search
CPC .............. B01D 71/383; B01D 71/0211; B01D 71/5223; B01D 71/5222; B01D 53/228
See application file for complete search history.

(56) References Cited

U.S. PATENT DOCUMENTS

| | | | | |
|---|---|---|---|---|
| 2005/0087491 A1* | 4/2005 | Hennige | B01D 67/009 210/508 |
| 2007/0022877 A1* | 2/2007 | Marand | B01J 31/1805 95/51 |
| 2009/0075141 A1* | 3/2009 | Gronwald | H01M 8/103 429/492 |
| 2010/0270234 A1* | 10/2010 | Liu | B01D 67/0006 521/27 |
| 2010/0326273 A1* | 12/2010 | Liu | B01D 67/0079 96/10 |
| 2016/0168485 A1* | 6/2016 | Li | B01J 20/3272 210/651 |
| 2017/0320977 A1* | 11/2017 | Holtcamp | B01J 23/44 |
| 2020/0398229 A1* | 12/2020 | Ho | B01D 71/82 |

OTHER PUBLICATIONS

K. Ramasubramanian, Y. Zhao, W.S.W. Ho, CO2 capture and H2 purification: Prospects for CO2-selective membrane processes, AIChE J. 59 (2013) 1033-1045.

R. Xing, W.S.W. Ho, Crosslinked polyvinylalcohol-polysiloxane/fumed silica mixed matrix membranes containing amines for CO2/H2 separation, J. Membr. Sci. 367 (2011) 91-102.

T. Fout, A. Zoelle, D. Keairns, M. Turner, M. Woods, N. Kuehn, V. Shah, V. Chou, and L. Pinkerton, "Cost and Performance Baseline for Fossil Energy Plants Volume: b: Bituminous Coal (IGCC) to Electricity Revision 2b—Year Dollar Update", National Energy Technology Laboratory Report, DOE/NETL-2015/1727 (2015). https://www.osti.gov/biblio/1480991.

Z. Qiao, Z. Wang, S. Yuan, J. Wang, S. Wang, Preparation and characterization of small molecular amine modified PVAm membranes for CO2/H2 separation, J. Membr. Sci. 475 (2015) 290-302.

* cited by examiner (a) Hydrolysis of aminosilane (b) Crosslinking/Amine incorporation via aminosilanol (c) Crosslinking via dialdehyde (a) Monodentate (b) Bidentate (c) Tridentate

| Name | Structure |
|---|---|
| 3-Aminopropyltriethoxysilane |  |
| *N*-[3-(Trimethoxysilyl)propyl]ethylenediamine |  |
| (*N*,*N*-Dimethylaminopropyl)trimethoxysilane |  |
| (*N*,*N*-Dimethylaminopropyl)dimethoxymethylsilane |  |
| (*N*,*N*-Dimethylaminopropyl)dimethylmethoxysilane |  |
| (*N*,*N*-Diethylaminopropyl)dimethoxymethylsilane |  |
| (*N*,*N*-Diisopropylaminopropyl)dimethoxymethylsilane |  |

CROSSLINKED FACILITATED TRANSPORT MEMBRANE FOR HYDROGEN PURIFICATION FROM COAL-DERIVED SYNGAS

CROSS-REFERENCE TO RELATED APPLICATIONS

This application is a national stage application filed under 35 U.S.C. § 371 of PCT/US2021/023031, filed Mar. 18, 2021, which claims the benefit of priority to U.S. Provisional Application No. 63/026,627 filed May 18, 2020, the disclosure of which is incorporated herein by reference in its entirety.

STATEMENT REGARDING FEDERALLY SPONSORED RESEARCH OR DEVELOPMENT

This invention was made with Government Support under Grant No. DE-FE0031635 awarded by U.S. Department of Energy. The Government has certain rights in the invention.

TECHNICAL FIELD

This disclosure relates to membrane, and more particularly to gas permeable membranes.

BACKGROUND

There has been growing concern about global warming since the $CO_2$ concentration in the atmosphere has surpassed 400 ppm in the past decade. The combustion of fossil fuels is one of the major contributors to the large amount of $CO_2$ emissions, and membrane technologies have been suggested as a promising approach to capture $CO_2$ from large stationary sources, followed by compression and geological sequestration. As one approach to produce large-scale electricity, coal can be gasified into a cleaner syngas, which can then be used to produce electricity via gas turbines or fuel cells. To capture $CO_2$ before deriving energy or to produce pure $H_2$ as a preferred chemical feedstock, the syngas can be subjected to a water-gas shift (WGS) reaction. In this scheme, typically named as integrated gasification combined cycle (IGCC), $CO_2$ has to be separated from $H_2$. Other minor components, include water vapor and $H_2S$, also needs to be removed. Accordingly, improved methods of separating $CO_2$ and $H_2$ are needed. The compositions and methods disclosed herein address these and other needs.

SUMMARY

Disclosed are membranes that include a gas permeable support layer and a selective polymer layer disposed on the support layer. The selective polymer layer can include a selective polymer matrix and optionally graphene oxide dispersed within the selective polymer matrix. The gas permeable support layer can comprise a gas permeable polymer. The gas permeable polymer can be a polymer including polyamides, polyimides, polypyrrolones, polyesters, sulfone-based polymers, polymeric organosilicones, fluorinated polymers, or polyolefins, copolymers thereof, or blends thereof. In some embodiments, the gas permeable polymer includes polyethersulfone. In certain cases, the gas permeable support layer comprises a gas permeable polymer disposed on a base (e.g., a nonwoven fabric such as a polyester nonwoven).

The selective polymer matrix can include a hydrophilic polymer, an amino compound (e.g., an amine-containing polymer, a low molecular weight amino compound, or a combination thereof), a cross-linking agent, a $CO_2$-philic ether, or a combination thereof.

The graphene oxide can be any suitable form of graphene oxide. In some embodiments, the graphene oxide can be nanoporous. The selective polymer layer can comprise from 0.01% to 5% by weight graphene oxide, based on the total dry weight of the selective polymer layer.

The membranes can exhibit selective permeability towards gases, such as carbon dioxide. In certain embodiments, the selective polymer matrix can exhibit a $CO_2$:$H_2$ selectivity of at least 50 (e.g., from 50 to 500) at 107° C. and 31.7 bar feed pressure.

Also provided are methods for separating a first gas from a feed gas stream using the membranes described. These methods can include contacting a membrane described with the feed gas stream including the first gas under conditions effective to afford transmembrane permeation of the first gas. The feed gas can include hydrogen, carbon dioxide, hydrogen sulfide, hydrogen chloride, carbon monoxide, nitrogen, methane, steam, sulfur oxides, nitrogen oxides, or combinations thereof.

In some embodiments, the first gas is chosen from carbon dioxide, hydrogen sulfide, hydrogen chloride, and combinations thereof. In some of these embodiments, the feed gas can include a second gas such as nitrogen, hydrogen, carbon monoxide, or combinations thereof. The membrane can exhibit a first gas/second gas selectivity of from 20 to 300 at 107° C. and 31.7 bar feed pressure.

In certain embodiments, the feed gas includes syngas. The first gas can include carbon dioxide and the second gas can include hydrogen. In these embodiments, the membranes described can be employed, for example, to decarbonize coal-derived syngas.

Also provided are methods of making a membrane that includes depositing a selective polymer layer on a support layer, the selective polymer layer comprising a selective polymer matrix and optionally a graphene oxide dispersed within the selective polymer matrix.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
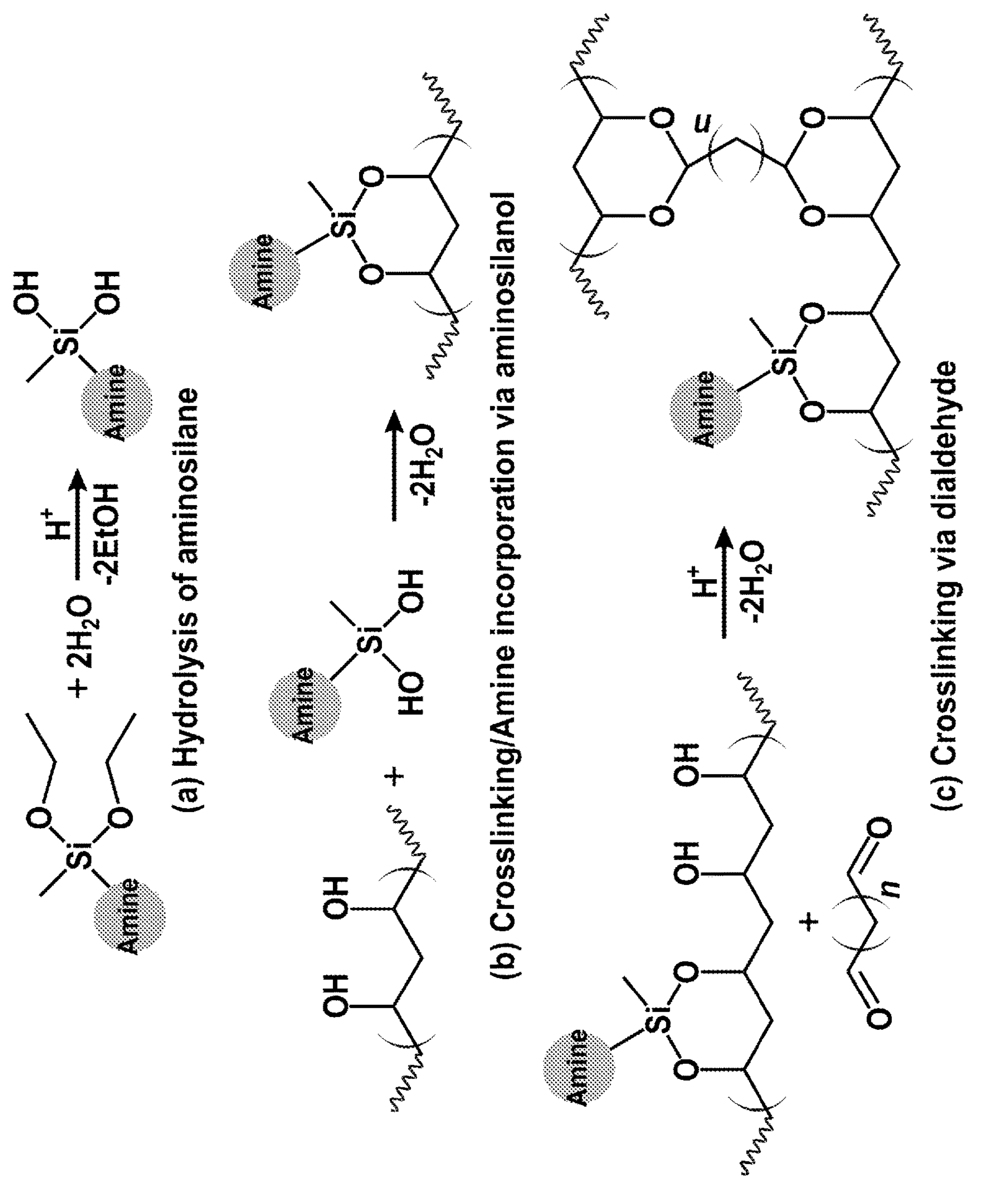
FIG. 1 is a reaction scheme showing the crosslinking reaction of PVA and aminosilane: (a) hydrolysis of aminosilane to afford silanol; (b) crosslinking of PVA by silanol; (c) additional crosslinking via dialdehyde. In the reaction scheme, 〰 represents a polymer chain.

Because of the high $CO_2/H_2$ selectivity, amine-containing polymeric membranes are a promising technology for efficient hydrogen purification. One benign factor of applying membrane to remove $CO_2$ in IGCC is that the syngas is typically delivered at a high pressure up to 50 bar with a considerable $CO_2$ concentration of 30-40%. The high $CO_2$ partial pressure provides a sufficient transmembrane driving force for selective $CO_2$ removal without incurring additional energy penalty. However, several engineering issues hinder the operation of amine-containing membranes at high feed pressure. Firstly, the $CO_2$ permeance of the membrane tends to reduce with increasing feed pressure, owing to the saturated amine carriers. Sophisticated understanding and design of the amine-$CO_2$ chemistry are required to achieve a highly selective membrane performance in the syngas separation modality. Secondly, the high feed pressure may compress the polymer material, which leads to membrane densification, thereby a reduced $CO_2$ permeance. Several inorganic nanofillers have been proposed to mitigate the membrane compaction, but none of them has demonstrated the feasibility at a feed pressure relevant to syngas purification.

A number of embodiments of the disclosure have been described. Nevertheless, it will be understood that various modifications may be made without departing from the spirit and scope of the invention. Accordingly, other embodiments are within the scope of the following claims. Disclosed herein are membranes which possess extraordinary $CO_2/H_2$ separation performances at high $CO_2$ partial pressure. The selective layer of the membrane can include, for example, polyvinylamine and crosslinked polyvinylalcohol as the polymer matrix and small molecule amines as the mobile carrier to facilitate the transport of $CO_2$. In certain compositions, $CO_2$-philic moieties based on the ether group (—C—O—C—) are also incorporated to enhance the $CO_2$ solubility. To address the membrane compaction issue, a small amount of nanoporous graphene oxide is dispersed as a two-dimensional reinforcement filler. Finally, a single-stage membrane process is described to capture 90°/% $CO_2$ from IGCC while delivering a $H_2$ recovery of >99%.

Accordingly, membranes, methods of making the membranes, and methods of using the membranes are described herein. The membranes can comprise a support layer, and a selective polymer layer disposed on the support layer.

Definitions

To facilitate understanding of the disclosure set forth herein, a number of terms are defined below. Unless defined otherwise, all technical and scientific terms used herein generally have the same meaning as commonly understood by one of ordinary skill in the art to which this disclosure belongs.

As used herein, "alkyl" means a straight or branched chain saturated hydrocarbon moieties such as those containing from 1 to 10 carbon atoms. A "higher alkyl" refers to saturated hydrocarbon having 11 or more carbon atoms. A "$C_6$-$C_{16}$" refers to an alkyl containing 6 to 16 carbon atoms. Likewise, a "$C_6$-$C_{22}$" refers to an alkyl containing 6 to 22 carbon atoms. Representative saturated straight chain alkyls include methyl, ethyl, n-propyl, n-butyl, n-pentyl, n-hexyl, n-septyl, n-octyl, n-nonyl, and the like; while saturated branched alkyls include isopropyl, sec-butyl, isobutyl, tert-butyl, isopentyl, and the like.

As used herein, the term "alkenyl" refers to unsaturated, straight or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH═$CH_2$; 1-propenyl refers to a group with the structure —CH═CH—$CH_3$; and 2-propenyl refers to a group with the structure —$CH_2$—CH═$CH_2$. Asymmetric structures such as $(Z^1Z^2)C{=}C(Z^3Z^4)$ are intended to include both the E and Z isomers. This can be presumed in structural formulae herein wherein an asymmetric alkene is present, or it can be explicitly indicated by the bond symbol C═C.

As used herein, the term "alkynyl" represents straight or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, I-ethyl- 2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl.

Non-aromatic mono or polycyclic alkyls are referred to herein as "carbocycles" or "carbocyclyl" groups. Representative saturated carbocycles include cyclopropyl, cyclobutyl, cyclopentyl, cyclohexyl, and the like; while unsaturated carbocycles include cyclopentenyl and cyclohexenyl, and the like.

"Heterocarbocycles" or "heterocarbocyclyl" groups are carbocycles which contain from 1 to 4 heteroatoms independently selected from nitrogen, oxygen and sulfur which can be saturated or unsaturated (but not aromatic), monocyclic or polycyclic, and wherein the nitrogen and sulfur heteroatoms can be optionally oxidized, and the nitrogen heteroatom can be optionally quaternized. Heterocarbocycles include morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

The term "aryl" refers to aromatic homocyclic (i.e., hydrocarbon) mono-, bi- or tricyclic ring-containing groups preferably having 6 to 12 members such as phenyl, naphthyl and biphenyl. Phenyl is a preferred aryl group. The term "substituted aryl" refers to aryl groups substituted with one or more groups, preferably selected from alkyl, substituted alkyl, alkenyl (optionally substituted), aryl (optionally substituted), heterocyclo (optionally substituted), halo, hydroxy, alkoxy (optionally substituted), aryloxy (optionally substituted), alkanoyl (optionally substituted), aroyl, (optionally substituted), alkylester (optionally substituted), arylester (optionally substituted), cyano, nitro, amino, substituted amino, amido, lactam, urea, urethane, sulfonyl, and, the like, where optionally one or more pair of substituents together with the atoms to which they are bonded form a 3 to 7 member ring.

As used herein, "heteroaryl" or "heteroaromatic" refers an aromatic heterocarbocycle having 1 to 4 heteroatoms selected from nitrogen, oxygen and sulfur, and containing at least 1 carbon atom, including both mono- and polycyclic ring systems. Polycyclic ring systems can, but are not required to, contain one or more non-aromatic rings, as long as one of the rings is aromatic. Representative heteroaryls are furyl, benzofuranyl, thiophenyl, benzothiophenyl, pyrrolyl, indolyl, isoindolyl, azaindolyl, pyridyl, quinolinyl, isoquinolinyl, oxazolyl, isooxazolyl, benzoxazolyl, pyrazolyl, imidazolyl, benzimidazolyl, thiazolyl, benzothiazolyl, isothiazolyl, pyridazinyl, pyrimidinyl, pyrazinyl, triazinyl, cinnolinyl, phthalazinyl, and quinazolinyl. It is contemplated that the use of the term "heteroaryl" includes N-alkylated derivatives such as a 1-methylimidazol-5-yl substituent.

As used herein, "heterocycle" or "heterocyclyl" refers to mono- and polycyclic ring systems having 1 to 4 heteroatoms selected from nitrogen, oxygen and sulfur, and containing at least 1 carbon atom. The mono- and polycyclic ring systems can be aromatic, non-aromatic or mixtures of aromatic and non-aromatic rings. Heterocycle includes heterocarbocycles, heteroaryls, and the like.

"Alkylthio" refers to an alkyl group as defined above with the indicated number of carbon atoms attached through a sulfur bridge. An example of an alkylthio is methylthio, (i.e., $-S-CH_3$).

"Alkoxy" refers to an alkyl group as defined above with the indicated number of carbon atoms attached through an oxygen bridge. Examples of alkoxy include, but are not limited to, methoxy, ethoxy, n-propoxy, i-propoxy, n-butoxy, s-butoxy, t-butoxy, n-pentoxy, and s-pentoxy. Preferred alkoxy groups are methoxy, ethoxy, n-propoxy, i-propoxy, n-butoxy, s-butoxy, t-butoxy.

"Alkylamino" refers an alkyl group as defined above with the indicated number of carbon atoms attached through an amino bridge. An example of an alkylamino is methylamino, (i.e., $-NH-CH_3$).

"Alkanoyl" refers to an alkyl as defined above with the indicated number of carbon atoms attached through a carbonyl bride (i.e., —(C═O)alkyl).

"Alkylsulfonyl" refers to an alkyl as defined above with the indicated number of carbon atoms attached through a sulfonyl bridge (i.e., $-S(=O)_2$alkyl) such as mesyl and the like, and "Arylsulfonyl" refers to an aryl attached through a sulfonyl bridge (i.e., $-S(=O)_2$aryl).

"Alkylsulfamoyl" refers to an alkyl as defined above with the indicated number of carbon atoms attached through a sulfamoyl bridge (i.e., $-NHS(=O)_2$alkyl), and an "Arylsulfamoyl" refers to an alkyl attached through a sulfamoyl bridge (i.e., $-NHS(=O)_2$aryl).

"Alkylsulfinyl" refers to an alkyl as defined above with the indicated number of carbon atoms attached through a sulfinyl bridge (i.e. —S(═O)alkyl).

The terms "cycloalkyl" and "cycloalkenyl" refer to mono-, bi-, or tri homocyclic ring groups of 3 to 15 carbon atoms which are, respectively, fully saturated and partially unsaturated. The term "cycloalkenyl" includes bi- and tricyclic ring systems that are not aromatic as a whole, but contain aromatic portions (e.g., fluorene, tetrahydronapthalene, dihydroindene, and the like). The rings of multi-ring cycloalkyl groups can be either fused, bridged and/or joined through one or more spiro unions. The terms "substituted cycloalkyl" and "substituted cycloalkenyl" refer, respectively, to cycloalkyl and cycloalkenyl groups substituted with one or more groups, preferably selected from aryl, substituted aryl, heterocyclo, substituted heterocyclo, carbocyclo, substituted carbocyclo, halo, hydroxy, alkoxy (optionally substituted), aryloxy (optionally substituted), alkylester (optionally substituted), arylester (optionally substituted), alkanoyl (optionally substituted), aryol (optionally substituted), cyano, nitro, amino, substituted amino, amido, lactam, urea, urethane, sulfonyl, and the like.

The terms "halogen" and "halo" refer to fluorine, chlorine, bromine, and iodine.

The term "substituted" refers to a molecule wherein at least one hydrogen atom is replaced with a substituent. When substituted, one or more of the groups are "substituents." The molecule can be multiply substituted. In the case of an oxo substituent ("═O"), two hydrogen atoms are replaced. Example substituents within this context can include halogen, hydroxy, alkyl, alkoxy, nitro, cyano, oxo, carbocyclyl, carbocycloalkyl, heterocarbocyclyl, heterocarbocycloalkyl, aryl, arylalkyl, heteroaryl, heteroarylalkyl, —NRaRb, —NRaC(═O)Rb, —NRaC(═O)NRaNRb, —NRaC(═O)ORb, $-NRaSO_2Rb$, —C(═O)Ra, —C(═O)ORa, —C(═O)NRaRb, —OC(═O)NRaRb, —ORa, —SRa, —SORa, $-S(=O)_2Ra$, $-OS(=O)_2Ra$ and $-S(=O)_2ORa$. Ra and Rb in this context can be the same or different and independently hydrogen, halogen hydroxyl, alkyl, alkoxy, alkyl, amino, alkylamino, dialkylamino, carbocyclyl, carbocycloalkyl, heterocarbocyclyl, heterocarbocycloalkyl, aryl, arylalkyl, heteroaryl, heteroarylalkyl.

The term "optionally substituted," as used herein, means that substitution with an additional group is optional and therefore it is possible for the designated atom to be unsubstituted. Thus, by use of the term "optionally substituted" the disclosure includes examples where the group is substituted and examples where it is not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Reference will now be made in detail to specific aspects of the disclosed materials, compositions, articles, and methods, examples of which are illustrated in the accompanying Examples.

Membranes

Membranes, methods of making the membranes, and methods of using the membranes are described herein. The membranes can comprise a gas permeable support layer, and a selective polymer layer disposed on the gas permeable support layer. The gas permeable support layer and the selective polymer layer can optionally comprise one or more sub-layers.

Gas Permeable Support Layer

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

Selective Polymer Layer

The selective polymer layer can include a selective polymer matrix and optionally, graphene oxide dispersed within the selective polymer matrix. The selective polymer matrix can include a hydrophilic polymer, an amino compound (e.g., an amine-containing polymer, a low molecular weight amino compound, or a combination thereof), a cross-linking agent, a $CO_2$-philic ether, or a combination thereof.

In other embodiments, the selective polymer matrix can include a combination of a hydrophilic polymer, cross-linking agent, and an amino compound. For example, in some cases, the selective polymer matrix can include an amino compound (e g, a small molecule, a polymer, or a combination thereof) dispersed in a hydrophilic polymer matrix.

In some embodiments, selective polymer matrix can include a hydrophilic polymer, an amino compound (e.g., an amine-containing polymer, a low molecular weight amino compound, or a combination thereof), a cross-linking agent, and a $CO_2$-philic ether. In some embodiments, selective polymer matrix can include a hydrophilic polymer, a cross-linking agent, and an amino compound (e.g., an amine-containing polymer, a low molecular weight amino compound, or a combination thereof).

In some embodiments the hydrophilic polymer (e.g., polyvinyl alcohol) is crosslinked. In some embodiments the hydrophilic polymer is crosslinked with aminosilanes.

The selective polymer matrix can include a crosslinked hydrophilic polymer, an amino compound (e.g., an amine-containing polymer, a low molecular weight amino compound, or a combination thereof), a $CO_2$-philic ether, or a combination thereof. In some embodiments, selective polymer matrix can include a crosslinked hydrophilic polymer, an amino compound (e.g., an amine-containing polymer, a low molecular weight amino compound, or a combination thereof), and a $CO_2$-philic ether. In some embodiments, selective polymer matrix can include a crosslinked hydrophilic polymer and an amino compound (e.g., an amine-containing polymer, a low molecular weight amino compound, or a combination thereof).

In some embodiments, selective polymer matrix can include an amine-containing polymer (e.g., polyvinylamine), a hydrophilic polymer (e.g., polyvinyl alcohol (PVA)), a cross-linking agent (e.g., aminosilane), and a low molecular weight amino compound (e.g., 2-(1-piperazinyl)ethylamine sarcosinate (PZEA-Sar), PZEA-aminoisobutyrate (ALBA), 2-hydroxyethylpiperazine (HEP), or a combination thereof). In some embodiments, selective polymer matrix can include an amine-containing polymer (e.g., polyvinylamine), a hydrophilic polymer (e.g., polyvinyl alcohol), a cross-linking agent (e.g., aminosilane), a low molecular weight amino compound (e.g., PZEA-Sar, PZEA-AIBA, HEP, or a combination thereof), and a $CO_2$-philic ether (e.g., poly(ethylene glycol) dimethyl ether). In some embodiments, selective polymer matrix can include an amine-containing polymer (e.g., polyvinylamine), a hydrophilic polymer (e.g., polyvinyl alcohol), and a cross-linking agent (e.g., aminosilane). In some embodiments, selective polymer matrix can include an amine-containing polymer (e.g., polyvinylamine), a hydrophilic polymer (e.g., polyvinyl alcohol), a cross-linking agent (e.g., aminosilane), and a $CO_2$-philic ether (e.g., poly(ethylene glycol) dimethyl ether).

In some embodiments, selective polymer matrix can include a hydrophilic polymer (e.g., polyvinyl alcohol), a cross-linking agent (e.g., aminosilane), and a low molecular weight amino compound (e.g., PZEA-Sar, PZEA-AIBA, HEP, or a combination thereof). In some embodiments, selective polymer matrix can include a hydrophilic polymer (e.g., polyvinyl alcohol), a cross-linking agent (e.g., aminosilane), a low molecular weight amino compound (e.g., PZEA-Sar, PZEA-AIBA, HEP, or a combination thereof), and a $CO_2$-philic ether (e.g., poly(ethylene glycol) dimethyl ether).

In some embodiments, selective polymer matrix can include an amine-containing polymer (e.g., polyvinylamine), a crosslinked hydrophilic polymer (e.g., aminosilane crosslinked polyvinyl alcohol), and a low molecular weight amino compound (e.g., PZEA-Sar, PZEA-AIBA, HEP, or a combination thereof). In some embodiments, selective polymer matrix can include an amine-containing polymer (e.g., polyvinylamine), a crosslinked hydrophilic polymer (e.g., aminosilane crosslinked polyvinyl alcohol), a low molecular weight amino compound (e.g., PZEA-Sar, PZEA-AIBA, HEP, or a combination thereof), and a $CO_2$-philic ether (e.g., poly(ethylene glycol) dimethyl ether). In some embodiments, selective polymer matrix can include an amine-containing polymer (e.g., polyvinylamine), a crosslinked hydrophilic polymer (e.g., aminosilane crosslinked polyvinyl alcohol), and a $CO_2$-philic ether (e.g., poly(ethylene glycol) dimethyl ether). In some embodiments, selective polymer matrix can include an amine-containing polymer (e.g., polyvinylamine), and a crosslinked hydrophilic polymer (e.g., aminosilane crosslinked polyvinyl alcohol).

In some embodiments, selective polymer matrix can include a crosslinked hydrophilic polymer (e.g., aminosilane crosslinked polyvinyl alcohol), and a low molecular weight amino compound (e.g., PZEA-Sar, PZEA-AIBA, HEP, or a combination thereof). In some embodiments, selective polymer matrix can include a crosslinked hydrophilic polymer (e.g., aminosilane crosslinked polyvinyl alcohol), a low molecular weight amino compound (e.g., PZEA-Sar, PZEA-AIBA, HEP, or a combination thereof), and a $CO_2$-philic ether (e.g., poly(ethylene glycol) dimethyl ether).

In some cases, the selective polymer layer can be a selective polymer matrix through which gas permeates via diffusion or facilitated diffusion. The selective polymer layer can comprise a selective polymer matrix having a $CO_2$:$H_2$ selectivity of at least 10 at 107° C. and 31.7 bar feed pressure. For example, the selective polymer matrix can have a $CO_2$:$H_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 107° C. and 31.7 bar feed pressure. In some embodiments, the selective polymer matrix can have a $CO_2$:$H_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 107° C. and 31.7 bar feed pressure.

In certain embodiments, the selective polymer layer can include a selective polymer matrix that has a $CO_2$:$H_2$ selectivity ranging from any of the minimum values described above to any of the maximum values described above. For example, in certain embodiments, the selective polymer layer can comprise a selective polymer matrix that has a $CO_2$:$H_2$ selectivity of from 10 to 500 at 107° C. and 31.7 bar feed pressure (e.g., from 10 to 400 at 107° C. and 31.7 bar feed pressure, from 75 to 400 at 107° C. and 31.7 bar feed pressure, from 100 to 400 at 107° C. and 31.7 bar feed pressure, from 10 to 350 at 107° C. and 31.7 bar feed pressure, from 75 to 350 at 107° C. and 31.7 bar feed pressure, from 100 to 350 at 107° C. and 31.7 bar feed pressure, from 10 to 250 at 107° C. and 31.7 bar feed pressure, from 75 to 250 at 107° C. and 31.7 bar feed pressure, or from 100 to 250 at 107° C. and 31.7 bar feed pressure). The $CO_2$:$H_2$ selectivity of the selective polymer can be measured using standard methods for measuring gas permeance known in the art, such as those described in the examples below.

Cross-Linking Agent

The selective polymer matrix can include a cross-linking agent. Cross-linking agents suitable for use in the selective polymer matrix can include, but are not limited to, aminosilane, formaldehyde, glutaraldehyde, maleic anhydride, glyoxal, divinylsulfone, toluenediisocyanate, trimethylol melamine, terephthalatealdehyde, epichlorohydrin, or vinyl acrylate, and combinations thereof. In some embodiments, the cross-linking agent can include aminosilane. In some embodiments, the cross-linking agent can include aminosilane and glyoxal. The selective polymer matrix can include any suitable amount of the cross-linking agent. For example, the selective polymer matrix can comprise 1 to 70 percent cross-linking agents by weight of the selective polymer matrix. In some embodiments, the cross-linking agent can be at least 30%, at least 35%, at least 40% or at least 50% In some embodiments, the cross-linking agent can be 40% aminosilane and 20% glyoxal by weight of the selective polymer matrix. In some embodiments, the cross-linking agent can be 35% aminosilane and 25% glyoxal by weight of the selective polymer matrix.

In some cases, the cross-linking agent can be an aminosilane tetravalent single bonded Si with at least one substituent containing an amino group(s) defined by formula I below Formula I

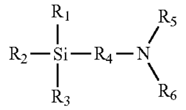

wherein $R_1$-$R_3$ are each independently selected from hydrogen, substituted or unsubstituted alkyl, alkenyl, alkynyl, alkoxy, aryl, heteroaryl, cycloalkyl, or heterocyclyl; $R_4$ is selected from substituted or unsubstituted alkyl, alkenyl, alkynyl, or alkoxy; and $R_5$ and $R_6$ are each independently selected from hydrogen, substituted or unsubstituted alkyl, alkenyl, alkynyl, alkoxy, aryl, heteroaryl, cycloalkyl, or heterocyclyl; or $R_5$ and $R_6$, together with the atoms to which they are attached, form a five- or a six-membered heterocycle;

wherein at least one $R_1$, $R_2$ or $R_3$ is a substituted or unsubstituted alkoxy.

In some cases, the cross-linking agent can be an aminosilane of Formula I, wherein $R_1$-$R_3$ are each independently selected from hydrogen, substituted or unsubstituted alkyl, alkenyl, alkynyl, alkoxy, aryl, heteroaryl, cycloalkyl, or heterocyclyl; $R_4$ is selected from substituted or unsubstituted alkyl; and $R_5$ and $R_6$ are each independently selected from hydrogen, substituted or unsubstituted alkyl, alkenyl, alkynyl, alkoxy, aryl, heteroaryl, cycloalkyl, or heterocyclyl; or $R_5$ and $R_6$, together with the atoms to which they are attached, form a five- or a six-membered heterocycle;

wherein at least one $R_1$, $R_2$ or $R_3$ is a substituted or unsubstituted alkoxy.

In some cases, the cross-linking agent can be an aminosilane of Formula I, wherein $R_1$-$R_3$ are each independently selected from hydrogen, substituted or unsubstituted alkyl, alkenyl, alkynyl, alkoxy, aryl, heteroaryl, cycloalkyl, or heterocyclyl; $R_4$ is selected from substituted or unsubstituted alkyl; and $R_5$ and $R_6$ are each independently selected from hydrogen, or substituted or unsubstituted alkyl;

wherein at least one $R_1$, $R_2$ or $R_3$ is a substituted or unsubstituted alkoxy.

Figure 8:
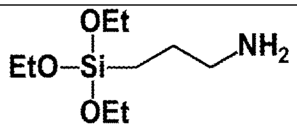
FIG. 8 is a table showing the structures of the aminosilanes used as crosslinkers.
Figure 8:
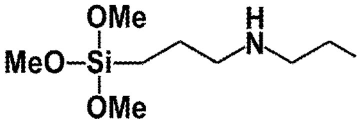
Figure 8:
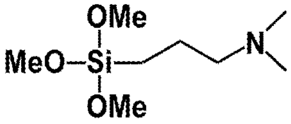
Figure 8:
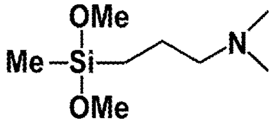
Figure 8:
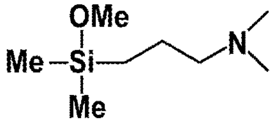
Figure 8:
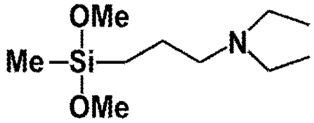
Figure 8:
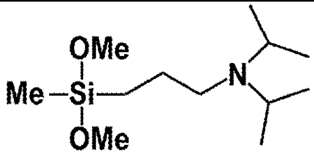

In some cases, the cross-linking agent can be 3-aminopropyltriethoxysilane, N-[3-(trimethoxysilyl)propyl]ethylenediamine, (N,N-dimethylaminopropyl)timethoxysilane, (N,N-dimenthylaminopropyl) dimethoxymethylsilane, (N,N-dimethylaminopropyl) dimethylmethoxysilane, (N,N-diethylaminopropyl) dimethoxymethylsilane, (N,N-diisopropylaminopropyl) dimethoxysilane, (N,N-diisopropylaminopropyl) trimethoxysilane, or blends thereof (FIG. 8).

Hydrophilic Polymers

The selective polymer matrix can include any suitable hydrophilic polymer. In some embodiments, the hydrophilic polymer is crosslinked with an aminosilane defined by Formula I. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinylalcohol.

The selective polymer matrix can include any suitable crosslinked hydrophilic polymer (e.g., aminosilane crosslinked polyvinyl alcohol). Examples of crosslinked hydrophilic polymers suitable for use in the selective polymer layer can include 3-aminopropyltriethoxysilane crosslinked polyvinyl alcohol, N-[3-(trimethoxysilyl)propyl]ethylenediamine crosslinked polyvinyl alcohol, (N,N-dimethylaminopropyl)timethoxysilane crosslinked polyvinyl alcohol, (N,N-dimenthylaminopropyl)dimethoxymethylsilane crosslinked polyvinyl alcohol, (N,N-dimethylaminopropyl)dimethylmethoxysilane crosslinked polyvinyl alcohol, (N,N-diethylaminopropyl)dimethoxymethylsilane crosslinked polyvinyl alcohol, (N,N-diisopropylaminopropyl)dimethoxysilane crosslinked polyvinyl alcohol, (N,N-diisopropylaminopropyl)trimethoxysilane crosslinked polyvinyl alcohol, or copolymers thereof, and blends thereof.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinyl alcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer layer can include any suitable amount of the hydrophilic polymer. For example, in some cases, the selective polymer layer can include from 10% to 90% by weight (e.g., from 10% to 50% by weight, or from 10% to 30% by weight) hydrophilic polymer, based on the total weight of the components used to form the selective polymer layer.

When present, the crosslinked hydrophilic polymer can have any suitable molecular weight. For example, the crosslinked hydrophilic polymer can have a weight average molecular weight of from 15,000 Da to 2,000,000 Da (e.g., from 50,000 Da to 200,000 Da). In some embodiments, the crosslinked hydrophilic polymer can include aminosilane crosslinked polyvinyl alcohol having a weight average molecular weight of from 50,000 Da to 150,000 Da. In other embodiments, the crosslinked hydrophilic polymer can be a high molecular weight crosslinked hydrophilic polymer. For example, the crosslinked hydrophilic polymer can have a weight average molecular weight of at least 500,000 Da (e.g., at least 700,000 Da, or at least 1,000,000 Da).

The selective polymer layer can include any suitable amount of the crosslinked hydrophilic polymer. For example, in some cases, the selective polymer layer can include from 10% to 90%/c by weight (e.g., from 10% to 50% by weight, or from 10% to 30% by weight) crosslinked hydrophilic polymer, based on the total weight of the components used to form the selective polymer layer.

Amino Compounds

In some embodiments, the amino compound can include a compound (e.g., a small molecule, a polymer, or a combination thereof) comprising one or more primary amine moieties and/or one or more secondary amine moieties. The amino compound can be, for example, an amine-containing polymer, a low molecular weight amino compound (i.e., a small molecule), or a combination thereof. In some embodiments, the selective polymer layer can comprise an amine-containing polymer and an amino acid salt. In these embodiments, the amine-containing polymer can serve as a "fixed-site carrier" and the amino acid salt can serve as a "mobile carrier."

In some embodiments, the amino compound comprises an amine-containing polymer (also referred to herein as a "fixed-site carrier"). The amine-containing polymer can have any suitable molecular weight. For example, the amine-containing polymer can have a weight average molecular weight of from 5,000 Da to 5,000,000 Da, or from 50,000 Da to 2,000,000 Da. Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof. In some embodiments, the amine-containing polymer can comprise polyvinylamine (e.g., polyvinylamine having a weight average molecular weight of from 50,000 Da to 2,000,000 Da). In some embodiments when the amino compound comprises an amine-containing polymer, the selective polymer layer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"). The low molecular weight amino compound can have a molecular weight of 1,000 Da or less (e.g., 800 Da or less, 500 or less, 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine. In some embodiments when the amino compound comprises a low molecular weight amino compound, the selective polymer layer can comprise a blend of the low molecular weight amino compound and a hydrophilic polymer (e.g., a low molecular weight amino compound dispersed in a hydrophilic polymer matrix).

In some cases, the low molecular weight amino compound can include an amino acid salt. The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

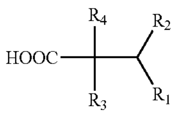

wherein, independently for each occurrence in the amino acid, each of $R_1$, $R_2$, $R_3$ and $R_4$ is selected from one of the following

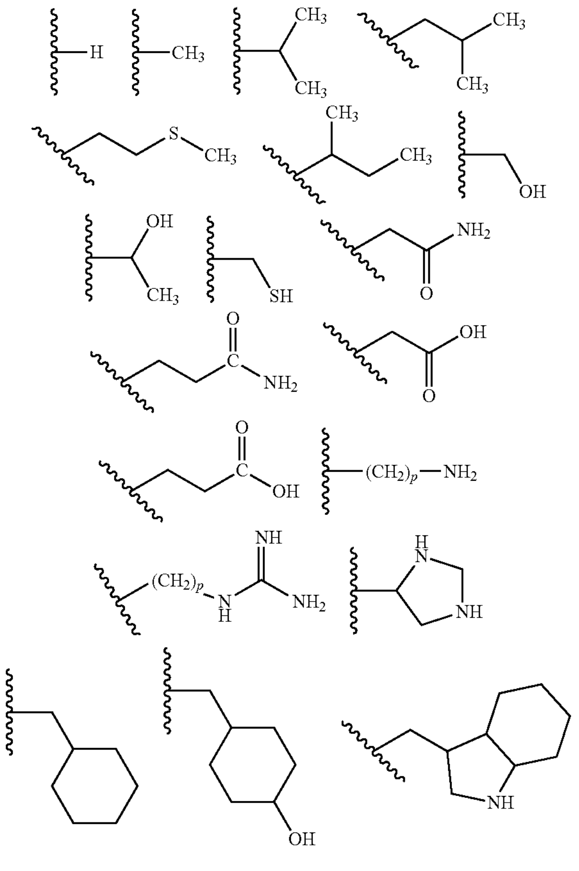

wherein at least one of $R_1$-$R_4$ comprises an amino group, or $R_1$ and $R_3$, together with the atoms to which they are attached, form a five-membered heterocycle defined by the structure below when n is 1, or a six-membered heterocycle defined by the structure below when n is 2,

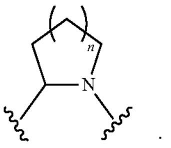

Poly(amino-acids), for example, polyarginine, polylysine, polyonithine, or polyhistidine may also be used to prepare the amino acid salt.

In other embodiments, the low molecular weight amino compound can be defined by a formula below

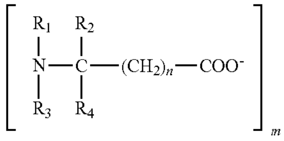

or

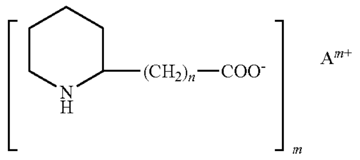

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3. In some cases, the cation ($A^{m+}$) can be an amine cation having the formula:

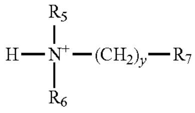

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

$CO_2$-Philic Ethers

The selective polymeric matrix can further include a one or more $CO_2$-philic ethers. The $CO_2$-philic ether can be a polymer, oligomer, or small molecule containing one or more ether linkages. Examples of $CO_2$-philic ethers include alcohol ethers, polyalkylene alcohol ethers, polyalkylene glycols, poly(oxyalkylene)glycols, poly(oxyalkylene)glycol ethers, ethoxylated phenol. In one embodiment, the $CO_2$-philic ether can comprise alkyl ethoxylate (C1-C6)-XEO X=1-30-linear or branched. In some embodiments, the $CO_2$-philic ether can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), polyethylene glycol dimethyl ether (PEGDME), or any combination thereof.

Graphene Oxide

The selective polymer layer can further include graphene oxide.

The term "graphene" refers to a one-atom-thick planar sheet of sp2-bonded carbon atoms that are densely packed in a honeycomb crystal lattice. In one embodiment, it refers to a single-layer version of graphite.

The term "graphene oxide" herein refers to functionalized graphene sheets (FGS)—the oxidized compositions of graphite. These compositions are not defined by a single stoichiometry. Rather, upon oxidation of graphite, oxygen-containing functional groups (e.g., epoxide, carboxyl, and hydroxyl groups) are introduced onto the graphite. Complete oxidation is not needed. Functionalized graphene generally refers to graphene oxide, where the atomic carbon to oxygen ratio starts at approximately 2. This ratio can be increased by reaction with components in a medium, which can comprise a polymer, a polymer monomer resin, or a solvent, and/or by the application of radiant energy. As the carbon to oxygen ratio becomes very large (e.g. approaching 20 or above), the graphene oxide chemical composition approaches that of pure graphene.

The term "graphite oxide" includes "graphene oxide", which is a morphological subset of graphite oxide in the form of planar sheets. "Graphene oxide" refers to a graphene oxide material comprising either single-layer sheets or multiple-layer sheets of graphite oxide. Additionally, in one embodiment, a graphene oxide refers to a graphene oxide material that contains at least one single layer sheet in a portion thereof and at least one multiple layer sheet in another portion thereof. Graphene oxide refers to a range of possible compositions and stoichiometries. The carbon to oxygen ratio in graphene oxide plays a role in determining the properties of the graphene oxide, as well as any composite polymers containing the graphene oxide.

The abbreviation "GO" is used herein to refer to graphene oxide, and the notation GO(m) refers to graphene oxide having a C:O ratio of approximately "m", where m ranges from 3 to about 20, inclusive. For example, graphene oxide having a C:O ratio of between 3 and 20 is referred to as "GO(3) to GO(20)", where m ranges from 3 to 20, e.g. m=3, 4, 5, 6, 7, 8, 9, 10, 11, 12, 13, 14, 15, 16, 17, 18, 19 or 20, including all decimal fractions of 0.1 increments in between, e.g. a range of values of 3-20 includes 3.0, 3.1, 3.2, 3.3, 3.4, 3.5, 3.6, 3.7, 3.8, 3.9, 4.0, and so on up to 20. Thus, as used herein, the term GO(m) describes all graphene oxide compositions having a C:O ratio of from 3 to about 20. For example, a GO with a C:O ratio of 6 is referred to as GO(6), and a GO with a C:O ratio of 8, is referred to as GO(8), and both fall within the definition of GO(m).

As used herein, "GO(L)" refers to low C:O ratio graphene oxides having a C:O ratio of approximately "L", wherein L is less than 3, e.g., in the range of from about 1, including 1, up to 3, and not including 3, e.g. about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or about 2.9. In many embodiments, a GO(L) material has a C:O ratio of approximately 2. The designations for the materials in the GO(L) group is the same as that of the GO(m) materials described above, e.g., "GO(2)" refers to graphene oxide with a C:O ratio of 2.

In some embodiments, the graphene oxide can be GO((m). In some embodiments, the graphene oxide can be GO(L). In some embodiments, the graphene oxide can be nanoporous.

Other Components

The selective polymer matrix can further include a base. The base can act as a catalyst to catalyze the cross-linking of the selective polymer matrix (e.g., cross-linking of a hydrophilic polymer with an amine-containing polymer). In some embodiments, the base can remain in the selective polymer matrix and constitute a part of the selective polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer matrix can comprise any suitable amount of the base. For example, the selective polymer matrix can comprise 1 to 40 percent base by weight of the selective polymer matrix.

The selective polymer layer further comprises carbon nanotubes dispersed within the selective polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 μm, at least 5 μm, at least 10 μm, or at least 15 μm). In some cases, the carbon nanotubes can have an average length of 20 μm or less (e.g., 15 μm or less, 10 μm or less, 5 μm or less, 1 μm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 μm (e.g., from 200 nm to 20 μm, or from 500 nm to 10 μm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then be coupled to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less) by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 25 microns (e.g., from 100 nanometers to 750 nanometers, from 250 nanometers to 500 nanometers, from 50 nm to 2 microns, from 50 nm to 20 microns, or from 1 micron to 20 microns). In some embodiments, the support layer can have a thickness of from 1 micron to 500 microns (e.g., from 50 to 250 microns). In some cases, the membranes disclosed herein can have a thickness of from 5 microns to 500 microns.

Methods of Making

Methods of making these membranes are also disclosed herein. Methods of making membranes can include depositing a selective polymer layer on a support layer to form a selective layer disposed on the support layer. The selective polymer layer can comprise a selective polymer matrix and graphene oxide dispersed within the selective polymer matrix.

Optionally, the support layer can be pretreated prior to deposition of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the selective polymer matrix (e.g., a hydrophilic polymer, a cross-linking agent, an amino compound, a $CO_2$-philic ether, or a combination thereof; and optionally a basic compound and/or graphene oxide in a suitable solvent). One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures. The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a selective polymer matrix containing for example, a hydrophilic polymer, a cross-linking agent, a base, an amino compound, a $CO_2$-philic ether, and/or graphene oxide can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the selective polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Methods of Use

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof. In some embodiments, the acid gas may be derived from fossil fuels that require hydrogen purification for fuel cell, electricity generation, and hydrogenation applications, biogas for renewable energy, and natural gas for commercial uses. For example, the membranes may be employed in a fuel cell (e.g., to purify feed gases prior to entering the fuel cell). The membranes can also be used for removal of carbon dioxide from flue gas.

In certain embodiments, the feed gas comprises syngas. The first gas can comprise carbon dioxide and the second gas can comprise hydrogen. In these embodiments, the membranes described herein can be employed, for example, to decarbonize coal-derived syngas.

The permeance of the first gas or the acid gas can be at least 50 GPU (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, 950 GPU or greater, 1000 GPU or greater, 1100 GPU or greater, 1200 GPU or greater, 1300 GPU or greater, or 1400 GPU or greater) at 107° C. and 31.7 bar feed pressure.

The permeance of the first gas or the acid gas can be 1500 GPU or less at 107° C. and 31.7 bar feed pressure (e.g., 1400 GPU or less, 1300 GPU or less, 1200 GPU or less, 1100 GPU or less, 1000 GPU or less, 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less).

The permeance of the first gas or the acid gas through the membrane can vary from any of the minimum values described above to any of the maximum values described above. For example, the permeance of the first gas or the acid gas can be from 50 GPU to 1500 GPU at 107° C. and 31.7 bar feed pressure (e.g., from 200 GPU to 1500 GPU, from 200 GPU to 1000 GPU, from 300 GPU to 1500 GPU at 120° C., from 300 GPU to 500 GPU, or from 500 GPU to 1500 GPU at 107° C. and 31.7 bar feed pressure).

The membrane can exhibit a first gas/second gas selectivity of at least 10 at 107° C. and 31.7 bar feed pressure. In some embodiments, the membrane can exhibit a first gas/second gas selectivity of up to 500 at 107° C. and 31.7 bar feed pressure. For example, the membrane can exhibit a first gas/second gas selectivity of 10 or greater, 25 or greater, 50 or greater, 75 or greater, 100 or greater, 125 or greater, 150 or greater, 175 or greater, 200 or greater, 225 or greater, 250 or greater, 275 or greater, 300 or greater, 325 or greater, 350 or greater, 375 or greater, 400 or greater, 425 or greater, 450 or greater, or 475 or greater at 107° C. and 31.7 bar feed pressure. In some embodiments, the permeance and selectivity of the membrane for the first gas or the acid gas can vary at higher or lower temperatures.

For the purposes of this specification and appended claims, unless otherwise indicated, all numbers expressing quantities, percentages or proportions, and other numerical values used in the specification and claims are to be understood as being modified in all instances by the term "about". Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a", "an", and "the", include plural references unless expressly and unequivocally limited to one referent.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

As used herein, terminology such as A, B, C, or any combination thereof (or the like such as A, B, C, or any mixtures thereof) relate to various options. In one embodiment, the terminology A, B, C, or any combination thereof means A only. In one embodiment, the terminology A, B, C, or any combination thereof means B only. In one embodiment, the terminology A, B, C, or any combination thereof means C only. In one embodiment, the terminology A, B, C, or any combination thereof means A and B only. In one embodiment, the terminology A, B, C, or any combination thereof means B and C only. In one embodiment, the terminology A, B, C, or any combination thereof means A and C only. In one embodiment, the terminology A, B, C, or any combination thereof means A, B, and C. Moreover, an embodiment can have a single A or a plurality of A. An embodiment can have a single B or a plurality of B. An embodiment can have a single C or a plurality of C.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

By way of non-limiting illustration, examples of certain embodiments of the present disclosure are given below.

EXAMPLES

Materials and Methods 2-(1-piperazinyl)ethylamine (PZEA, 99%), 2-aminoisobutyric acid (AIBA, 98%), 1,4-bis(2-hydroxyethyl) piperazine (DHEP, 98%), poly(ethylene glycol) dimethyl ether (PEGDME, $M_n$~250), glyoxal (40%), and hydrogen chloride (HCl, 35%) were purchased from Sigma-Aldrich (Milwaukee, Wis.). PVA (Poval S-2217, 92%) was given by Kuraray America Inc. (Houston, Tex.). Monolayer graphene oxide (GO) was purchased from TCI America (Portland, Oreg., USA) in the form of solid flakes. All the chemicals were used as received without further purification. For gas permeation measurements, pre-purified $CO_2$ and argon were purchased from Praxair Inc. (Danbury, Conn.).

Example 1: Crosslinking of PVA via Aminosilane

FIG. 1 shows the general reaction scheme of the crosslinking of PVA. As shown in FIG. 1 (*a*), the aminosilane undergoes hydrolysis to afford silanol in the presence of an acid. A condensation reaction between PVA and silanol occurs (FIG. 1 (*b*)) to make —C—O—Si— linkage, which crosslinks the PVA chains as well as grafting amino groups on to the polymer network.

The pH of an ethanol/water mixture (95/5 wt./wt.) was adjusted to 6 via acetic acid. The aminosilane was added with stirring to yield a 2 wt. % solution. The solution was kept under stirring for 5 minutes to allow for the formation of silanol. Certain amount of the solution was then added in an 8 wt. % high MW PVA aqueous solution at room temperature. After a homogenization for 5 minutes, extra acetic acid was added to yield a pH of 4. The system was then refluxed at 80° C. for 2 hours. To further tighten up the polymer network, an extra portion of the hydroxyl groups on the PVA was converted to acetal linkages via glyoxal. Experimentally, certain amount of the glyoxal solution (40 wt. %) was added into the mixture under vigorous agitation. The final crosslinking was carried out at 80° C. for 2 hours. The pH of the gel was then adjusted to 12 by strong basic anion-exchange resin.

The degree of crosslinking was characterized by a solvent extraction method. The synthesized gel solution was poured into a borosilicate Petri dish and dried at room temperature. The resultant dried film was peeled off and cured at 120° C. for 6 hours. This crosslinked film was kept in reverse osmosis (RO) water at room temperature. The solvent was replaced every 24 hours and its absorbance was measured by a UV-Vis spectrophotometers (UV-1700, Shimadzu, Japan) until no further change. The ratio of the remaining weight to the original dry weight was defined as the crosslinking degree.

Example 2: Preparation of Nanoporous GO

The GO was dispersed in water (~1 mg/ml) by an ultrasonication probe with a power of 2500 W for 3 hours. KOH solution (50 wt. %) was added slowly into the GO dispersion with a KOH-to-GO weight ratio of 14:1 to prevent the precipitation of GO. The mixture was further ultrasonicated for 30 minutes. After this, the water was evaporated in a convection oven at 60° C., followed by a further drying in a vacuum oven at 60° C. overnight. The resultant solid was annealed at 200° C. for 2 hours to create pores on the GO basal plane. After the thermal treatment, the solid was washed by DI water under vacuum filtration until the filtrate reached a pH of 7. The purified nanoporous GO (nGO) was dispersed in water again (~1 mg/ml) by a ultrasonication bath.

Example 3: Coating Solution and Membrane Preparation

The nGO-reinforced composite membranes were synthesized by the following steps.

The nGO dispersion with a concentration of ~1 mg/ml was added dropwise to the crosslinked PVA solution by a 10-μL glass capillary tube under vigorous agitation, aiming for 1 wt. % nGO loading in the final total solid of the coating solution. The mixture was transferred to a 15-mL conical centrifuge tube, in which it was homogenized by the ⅛" Microtip sonication probe with a 50% amplitude until uniformly dispersed. The sonication was carried out in an ice bath. The water introduced by the nGO dispersion was vaporized by a nitrogen purge.

The amino acid salt mobile carriers were synthesized by reacting the base, PZEA, with an amino acid, AIBA. Stoichiometric amount of AIBA was added in a 24 wt. % PZEA aqueous solution under vigorous mixing. The solution was mixed at room temperature for 2 hours before use.

Certain amount of the mobile carrier solutions, including the amino acid and the $CO_2$-philic moieties, were incorporated in the dispersion to form the coating solution. After centrifugation at 8,000×g for 3 minutes to remove any air bubbles, the coating solution was coated on a nanoporous polysulfone (PSf) substrate by a GARDCO adjustable micrometer film applicator (Paul N. Gardner Company, Pompano Beach, Fla.) with a controlled gap setting. The membrane was dried in a fume hood at room temperature for 30 minutes, then cured at 120° C. for 6 hours.

Example 4: Gas Permeation Measurements

The transport properties of the composite membrane were measured by a Wicke-Kallenbach permeation apparatus [2]. The membranes were tested at 107° C. and 31.7 bar feed pressure with a simulated syngas containing 4% water and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. The permeate pressure was maintained at 1 psig. After leaving the gas permeation cell, the water vapors in both the retentate and the permeate were trapped in respective water knockout vessels. The dry gas compositions of both gas streams were analyzed using a gas chromatograph that was equipped with a thermal conductivity detector (Model 6890 N, Agilent Technologies, Palo Alto, Calif.) and a stainless steel micropacked column (80/100 mesh Carboxen 1004, Sigma-Aldrich, St. Louis, Mo.).

Example 5: Enhanced Chemisorption of $CO_2$ via Aminosilanes

Three aminosilanes were employed to demonstrate the effect of aminosilane on the chemisorption of $CO_2$. The three aminosilanes were (1) 3-aminopropyltriethoxysilane containing a primary (1°) amino group, (2) N-[3-(trimethoxysilyl)propyl]ethylenediamine containing a secondary (2°) amino group, and (3) (N,N-dimethylaminopropyl) trimethoxysilane containing a tertiary (30) amino group. Hereafter in this example, they are denoted as AS-1°, AS-2°, and AS-3°, respectively.

1 g of crosslinked PVA aqueous solution (8 wt. % concentration, 35 mol % crosslinked by aminosilane and 25% crosslinked by glyoxal) was prepared by the method described in the previous section. Then, 8 g of nGO dispersion (~0.1 wt. %) was added in the polymer solution dropwise under vigorous mixing. After this, the mixture was sonicated to re-disperse. Afterwards, the water introduced by the nGO dispersion was evaporated by N2. Finally, 0.14 g DHEP and 0.14 g PEGDME were added in the dispersion, respectively, to form a homogeneous coating solution. A centrifugation at 8,000×g for 3 min was conducted to remove any air bubbles entrapped in the coating solution. The coating solution was coated on a nanoporous polysulfone (PSf) substrate by a GARDCO adjustable micrometer film applicator, resulting in a selective layer thickness of 15 μm. The membrane was dried in a fume hood at room temperature for 30 min, then cured at 120° C. for 6 h.

Figure 2:
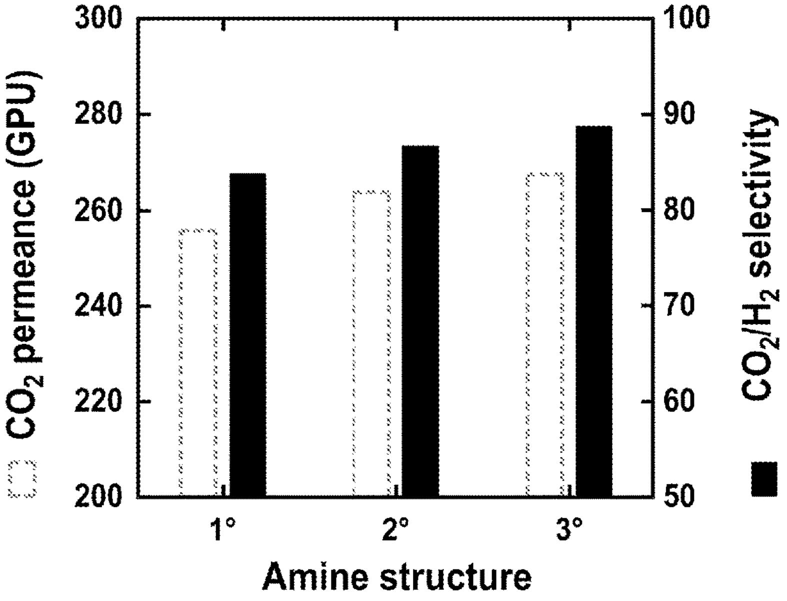
FIG. 2 is a bar graph showing the effect of the amine structure on aminosilane on $CO_2$ permeance (white) and $CO_2/H_2$ selectivity (black) at a feed pressure of 31.7 bar and a $CO_2$ partial pressure of 12.5 bar.

The $CO_2/H_2$ separation performances were tested at a $CO_2$ partial pressure of 12.5 bar, and the results are shown in FIG. 2. As seen, the membrane crosslinked by 1° aminosilane showed a $CO_2$ permeance of 256 GPU but a low $CO_2/H_2$ selectivity of 84. By using 2° aminosilane as the crosslinker, the membrane showed an improved permeance of 264 GPU as well as a higher selectivity of 87. The increased $CO_2$ permeance was attributed to the higher amine loading introduced by the diamine. However, the highest permeance was achieved by the 3° aminosilane, where the 3° monoamine led to a 269 GPU $CO_2$ permeance and an 89 $CO_2/H_2$ selectivity. In this case, the 3° amine does not react with $CO_2$ directly, but generates hydroxide ion to fixate $CO_2$ as $HCO_3$_. Stoichiometrically, one mole of 3° amine reacts with one mole of $CO_2$. Although this reaction is known to be slow, a higher $CO_2$ uptake is generally more important than the sorption kinetics when the feed $CO_2$ partial pressure is high. Therefore, the membrane crosslinked by 3° aminosilane showed the highest $CO_2$ permeance. Based on this set of data, the 3° aminosilane was chosen for the following membrane synthesis.

Example 6: Effect of Silane Functionality

Figure 3:
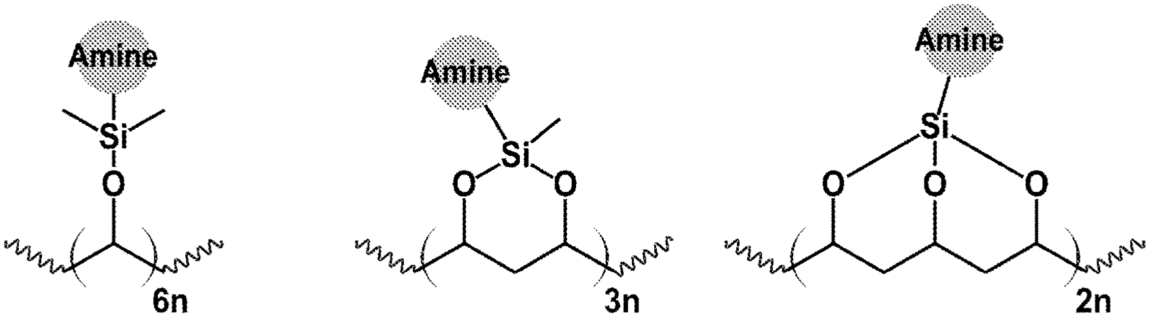
FIG. 3 is a reaction scheme showing the crosslinking reaction of PVA with (a) monodentate (AS-1), (b) bidentate (AS-2), and (c) tridentate aminosilanes (AS-3).

Three aminosilanes were employed to demonstrate the effect of silane functionality. The three aminosilanes were (1) (N,N-dimethylaminopropyl)dimethylmethoxysilane, a monodentate silane, (2) (N,N-dimethylaminopropyl)dimethoxymethylsilane, a bidentate silane, and (3) (N,N-dimethylaminopropyl)trimethoxysilane, a tridentate silane. As shown in FIG. 3, the monodentate aminosilane cannot crosslink the polymer; rather, it can only graft amine as pendent groups. The bidentate and tridentate aminosilanes are capable of crosslinking the polymer; the tridentate silane introduces a higher crosslinking degree. Hereafter in this example, they are denoted as AS-1, AS-2, and AS-3, respectively.

Figure 4A:
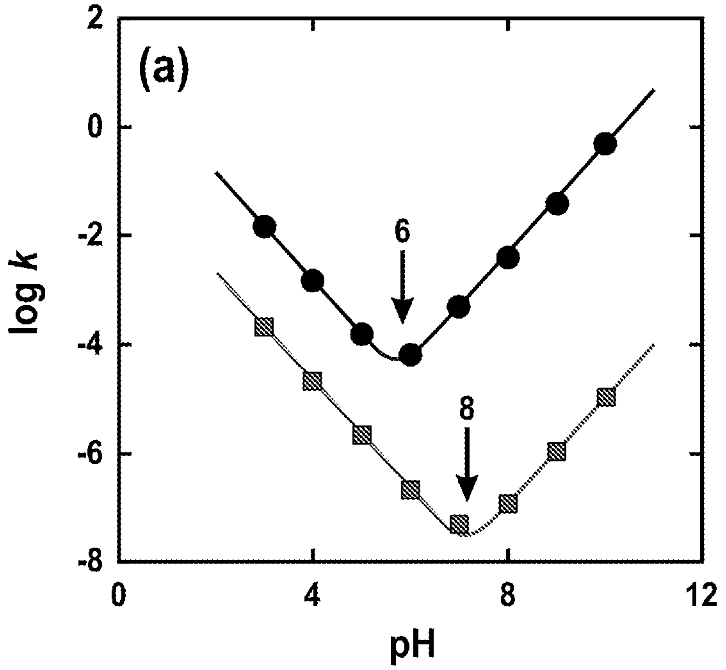
FIG. 4 A-C are a line graphs showing the Hydrolysis (circle) and condensation (square) rates of (FIG. 4A) AS-1, (FIG. 4B) AS-2, and (FIG. 4C) AS-3 in ethanol/water mixture (95/5 wt./wt.) at 25° C. The pH was adjusted by acetic acid-d4.
Figure 4B:
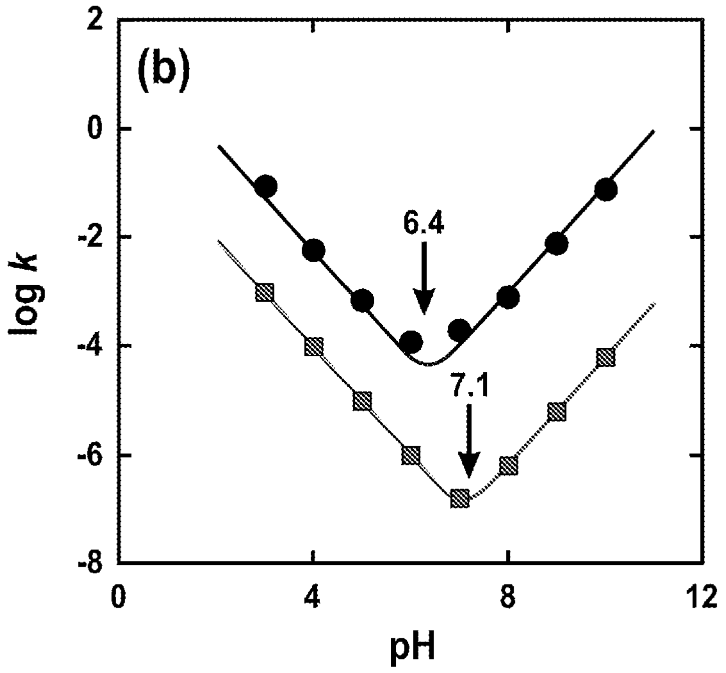
Figure 4C:
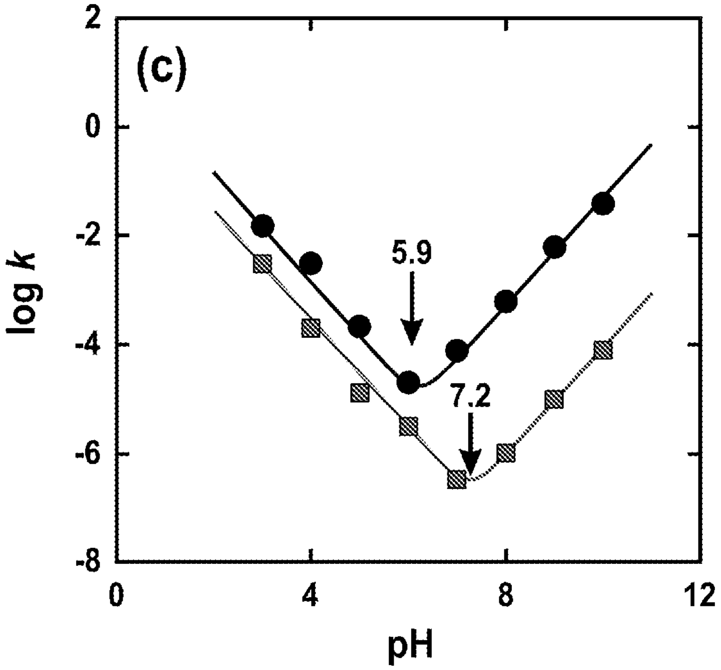

It should be noted that a self-condensation reaction can occur for the silanol, which leads to the formation of siloxane (—Si—O—Si—). This structure not only reduces the effective crosslinking of the polyalcohol, but also results in certain heterogeneity in the polymer network. To suppress this side reaction, the hydrolysis and condensation rates of 2 mol % aminosilane was studied in a mixture of ethanol-d6 and $H_2O$ (95/5 wt./wt.) at 25° C. The pH was adjusted in the range of 3-10 by acetic acid-d4. The transient concentrations of alkoxy and alkanol were measured by $^1H$ nuclear magnetic resonance (NMR) to trace the reaction kinetics. As seen in FIGS. 4A-4C, the hydrolysis and condensation rates both depended strongly on the pH. In general, an acidic environment favored the hydrolysis while a basic condition favored the condensation. In comparison, AS-1 exhibited a very low rate of condensation because it could only form dimers. AS-3, however, tended to condensate, likely due to the more silanol groups. Based on this set of data, an aminosilane solution can be devised in which the rate of hydrolysis is substantially greater than that of the condensation. At a pH of 6, the rates of hydrolysis were at least two orders of magnitude higher than the rates of condensation for AS-1 and AS-2, respectively. Therefore, relatively stable silanol solutions could be formed to crosslink the polyalcohol. For AS-3, the pH had to be reduced to 5 in order to obtain a stable solution.

1 g of crosslinked PVA aqueous solution (8 wt. % concentration, 35 mol % crosslinked by aminosilane and 25% crosslinked by glyoxal) was prepared by the method described in the previous section. Then, 8 g of nGO dispersion (~0.1 wt. %) was added in the polymer solution dropwise under vigorous mixing. After this, the mixture was sonicated to re-disperse. Afterwards, the water introduced by the nGO dispersion was evaporated by N2. Finally, 0.14 g DHEP and 0.14 g PEGDME were added in the dispersion, respectively, to form a homogeneous coating solution. A centrifugation at 8,000×g for 3 min was conducted to remove any air bubbles entrapped in the coating solution. The coating solution was coated on a nanoporous polysulfone (PSf) substrate by a GARDCO adjustable micrometer film applicator, resulting in a selective layer thickness of 15 μm. The membrane was dried in a fume hood at room temperature for 30 min, then cured at 120° C. for 6 h.

Figure 5:
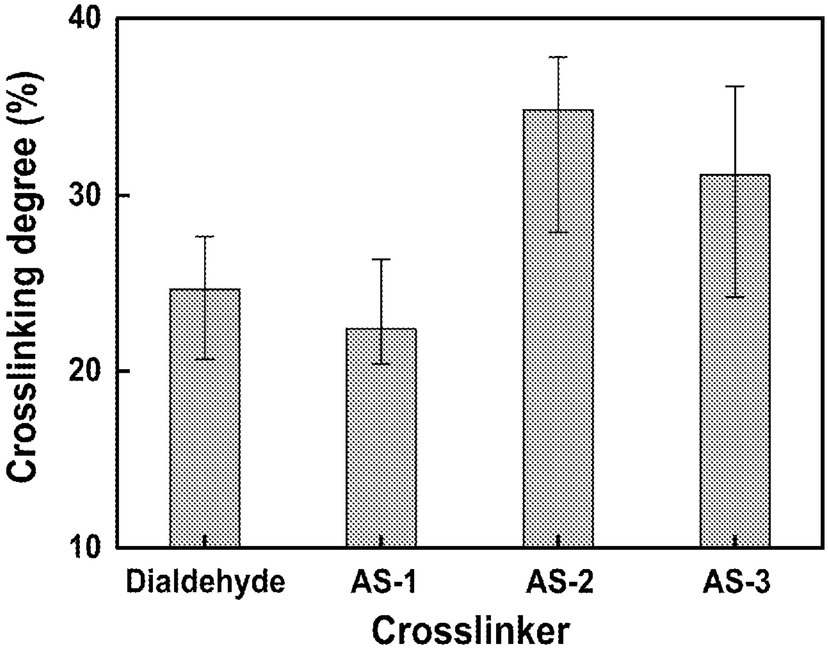
FIG. 5 is a bar graph showing the crosslinking degrees of polyalcohol with different crosslinkers. From left to right: dialdehyde, dialdehyde+AS-1, dialdehyde+AS-2, dialdehyde+AS-3.

The crosslinking degree of the membranes crosslinked by different aminosilanes are shown in FIG. 5. As seen, the dialdehyde glyoxal rendered 24.7% of the polyalcohol crosslinked. By adding additional AS-1, the crosslinking degree reduced to 22.4%. As discussed above, AS-1 could not crosslink the polymer. The reduction in the crosslinking degree was due to the leaching-out of the siloxane dimer. By using AS-2, the crosslinking degree increased to 34.9%, which was close to the calculated amount added experimentally. For AS-3, although it contained the highest site for crosslinking, the measured crosslinking degree was only 31.2%, suggesting the occurrence of self-condensation.

Figure 6:
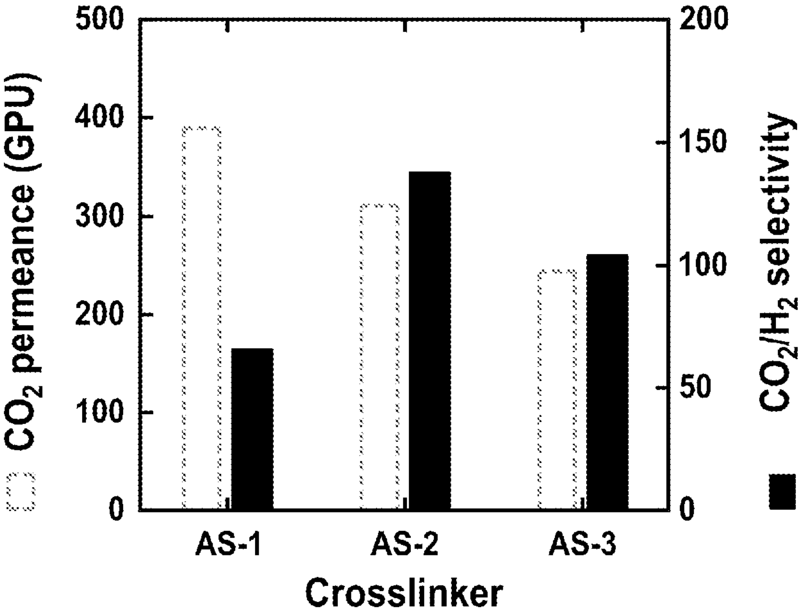
FIG. 6 is a bar graph showing the effects of aminosilane functionality on $CO_2$ permeance (white) and $CO_2/H_2$ selectivity (black) at a feed pressure of 31.7 bar and a $CO_2$ partial pressure of 12.5 bar.

The $CO_2/H_2$ separation performances were tested at a $CO_2$ partial pressure of 12.5 bar, and the results are shown in FIG. 6. As seen, by increasing the crosslinking site per molecule of the aminosilane, the $CO_2$ permeance reduced from 391 to 314, then to 246 GPU. The reduced $CO_2$ permeance was attributed to the increased crosslinking degree as discussed in FIG. 5. A highly crosslinked polymer network was less prone to swelling in the presence of water vapor, thereby a reduced free volume for gas permeation. On the other hand, the $CO_2/H_2$ selectivity increased from 66 to 138, then reduced to 105. The low crosslinking degree could explain the low $CO_2/H_2$ selectivity of the membrane crosslinked by AS-1, where the swollen polymer network could not hamper the $H_2$ permeation effectively. The low selectivity of the membrane crosslinked by AS-3, however, was mainly a consequence of the self-condensation of AS-3. The resultant formation of siloxane induced certain heterogeneity in the membrane, which could serve as defect sites for $H_2$ permeation. This set of experiments suggested that the bidentate aminosilane was the best crosslinker for membrane synthesis.

Example 7: Effect of Aminosilane Substituent

Three aminosilanes were employed to demonstrate the effect of the basicity of the aminosilane. The three aminosilanes were (1) (N,N-dimethylaminopropyl)dimethoxymethylsilane with the first pKa of 10.16 (2) (N,N-diethylaminopropyl)dimethoxymethylsilane with the first pKa of 10.98, and (3) (N,N-diisopropylaminopropyl)trimethoxysilane with the first pKa of 11.70. Hereafter in this example, they are denoted as AS-Me, AS-Et, and AS-Pr, respectively.

1 g of crosslinked PVA aqueous solution (8 wt. % concentration, 35 mol % crosslinked by aminosilane and 25% crosslinked by glyoxal) was prepared by the method described in the previous section. Then, 8 g of nGO dispersion (~0.1 wt. %) was added in the polymer solution dropwise under vigorous mixing. After this, the mixture was sonicated to re-disperse. Afterwards, the water introduced by the nGO dispersion was evaporated by N2. Finally, 0.14 g DHEP and 0.14 g PEGDME were added in the dispersion, respectively, to form a homogeneous coating solution. A centrifugation at 8,000×g for 3 min was conducted to remove any air bubbles entrapped in the coating solution. The coating solution was coated on a nanoporous polysulfone (PSf) substrate by a GARDCO adjustable micrometer film applicator, resulting in a selective layer thickness of 15 μm. The membrane was dried in a fume hood at room temperature for 30 min, then cured at 120° C. for 6 h.

Figure 7:
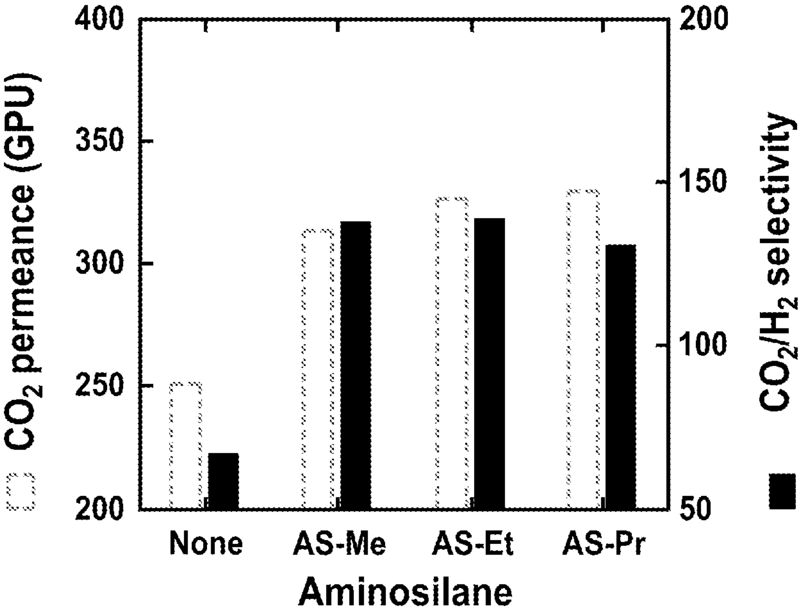
FIG. 7 is a bar graph showing the effects of the basicity of aminosilane on $CO_2$ permeance (white) and $CO_2$/N2 selectivity (black) at a feed pressure of 31.7 bar and a $CO_2$ partial pressure of 12.5 bar.

The $CO_2/H_2$ separation performances were tested at a $CO_2$ partial pressure of 12.5 bar, and the results are shown in FIG. 7. As seen, the membrane containing no aminosilane showed a low $CO_2$ permeance of 251 GPU and a $CO_2/H_2$ selectivity of 67. The crosslinking degree of this membrane was only ca. 24%. The loosely conformed polymer matrix could not sufficiently refrain the permeation of $H_2$, thus the low selectivity. The low $CO_2$ permeance, however, was inconsistent with the loose polymer matrix. It was suspected that the chain packing of the PVA was not sufficiently restricted because of the lack of acetal and siloxane linkages in this membrane. Therefore, there might be semi-crystalline regions that deterred the $CO_2$ permeation.

By using AS-Me as the crosslinker, the $CO_2$ permeance increased to 314 GPU, along with a better $CO_2/H_2$ selectivity of 138. The incorporation of the 3° amino groups enhanced the chemisorption of $CO_2$, thereby the higher permeance. In addition, the higher crosslinking degree was less prone to swelling in the presence of water vapor, thereby a tighter polymer network to reduce the $H_2$ permeation. When the aminosilane was changed to AS-Et and AS-Pr, the $CO_2$ permeance further increased to 327 GPU then to 331 GPU. This was in line with the increased basicity of the aminosilanes, which generated more hydroxide ions readily available for the reaction with $CO_2$. On the other hand, the $CO_2/H_2$ selectivity reduced upon the change of the aminosilane, mainly because of the inching up $H_2$ permeance. Likely, the bulkier ethyl and isopropyl substituents slightly increased the free volume of the membrane. Overall, AS-Et, in combination with the dialdehyde, was proven to be the best crosslinker.

REFERENCES

[1] K. Ramasubramanian, Y. Zhao, W. S. W. Ho, $CO_2$ capture and $H_2$ purification: Prospects for $CO_2$-selective membrane processes, AIChE J. 59 (2013) 1033-1045.

[2] R. Xing, W. S. W. Ho, Crosslinked polyvinylalcohol-polysiloxane/fumed silica mixed matrix membranes containing amines for $CO_2/H_2$ separation, J. Membr. Sci. 367 (2011) 91-102.

[3] T. Fout, A. Zoelle, D. Keairns, M. Turner, M. Woods, N. Kuehn, V. Shah, V. Chou, and L. Pinkerton, "Cost and Performance Baseline for Fossil Energy Plants Volume b: Bituminous Coal (IGCC) to Electricity Revision 2b—Year Dollar Update", National Energy Technology Laboratory Report, DOE/NETL-2015/1727 (2015).

[4] Z. Qiao, Z. Wang, S. Yuan, J. Wang, S. Wang, Preparation and characterization of small molecular amine modified PVAm membranes for $CO_2/H_2$ separation, J. Membr. Sci. 475 (2015) 290-302.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:

a support layer; and a selective polymer layer disposed on the support layer, the selective polymer layer comprising a selective polymer matrix, wherein the selective polymer matrix comprises a hydrophilic polymer, an aminosilane cross-linking agent, and a $CO_2$-philic ether.

2. The membrane of claim 1, wherein the selective polymer layer further comprises graphene oxide dispersed within the selective polymer matrix.

3. The membrane of claim 1, wherein the selective polymer matrix further comprises an amino compound.

4. The membrane of claim 3, wherein the selective polymer matrix further comprises a low molecular weight amino compound.

5. The membrane of claim 1, wherein the aminosilane cross-linking agent is an aminosilane tetravalent single bonded Si with at least one substituent containing an amino group(s) defined by formula I below Formula I

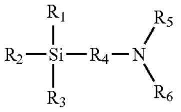

wherein $R_1$-$R_3$ are each independently selected from hydrogen, substituted or unsubstituted alkyl, alkenyl, alkynyl, alkoxy, aryl, heteroaryl, cycloalkyl, or heterocyclyl; $R_4$ is selected from substituted or unsubstituted alkyl, alkenyl, alkynyl, or alkoxy; and $R_5$ and $R_6$ are each independently selected from hydrogen, substituted or unsubstituted alkyl, alkenyl, alkynyl, alkoxy, aryl, heteroaryl, cycloalkyl, or heterocyclyl; or $R_5$ and $R_6$, together with the atoms to which they are attached, form a five-or a six-membered heterocycle;

wherein at least one $R_1$, $R_2$ or $R_3$ is a substituted or unsubstituted alkoxy.

6. The membrane of claim 1, wherein the aminosilane cross-linking agent is selected from the group consisting of 3-aminopropyltriethoxysilane, N-[3-(trimethoxysilyl) propyl] ethylenediamine, (N,N-dimethylaminopropyl)timethoxysilane, (N,N-dimenthylaminopropyl) dimethoxymethylsilane, (N,N-dimethylaminopropyl)dimethylmethoxysilane, (N,N-diethylaminopropyl)dimethoxymethylsilane, (N,N-diisopropylaminopropyl)dimethoxysilane, (N,N-diisopropylaminopropyl)trimethoxysilane, and blends thereof.

7. The membrane of claim 1, wherein the hydrophilic polymer comprises a polymer selected from the group consisting of polyvinylalcohol, polyvinylacetate, polyethylene oxide, polyvinylpyrrolidone, polyacrylamine, and copolymers thereof, or blends thereof.

8. The membrane of claim 1, wherein the polymer matrix comprises a crosslinked hydrophilic polymer.

9. The membrane of claim 3, wherein the amino compound comprises a low molecular weight amino compound.

10. The membrane of claim 3, wherein the low molecular weight amino compound comprises a salt of a primary amine or a salt of a secondary amine.

11. The membrane of claim 3, wherein the low molecular weight amino compound comprises a salt defined by a general formula below

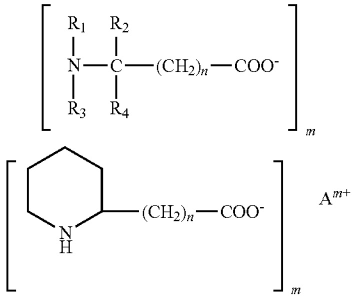

wherein $R_1$, $R_2$, $R_3$, and $R_4$ are hydrogen or hydrocarbon groups having from 1 to 4 carbon atoms, n is an integer ranging from 0 to 4, and $A^{m+}$ is a cation having a valence of 1 to 3, and m is an integer equal to the valence of the cation.

12. The membrane of claim 3, wherein the low molecular weight amino compound comprises an amino acid salt.

13. The membrane of claim 12, wherein the amino acid salt is defined by the formula below

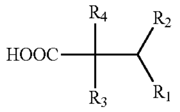

wherein, independently for each occurrence in the amino acid, each of $R_1$, $R_2$, $R_3$ and $R_4$ is selected from one of the following

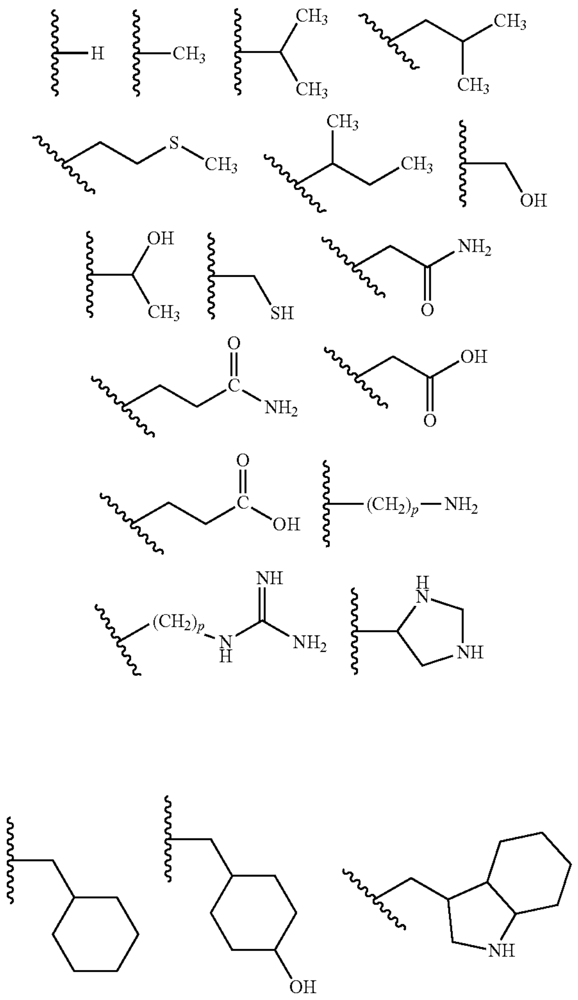

wherein at least one of $R_1$-$R_4$ comprises an amino group, or $R_1$ and $R_3$, together with the atoms to which they are attached, form a five-membered heterocycle defined by the structure below when n is 1, or a six-membered heterocycle defined by the structure below when n is 2

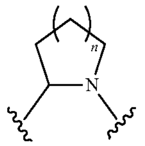

.

14. The membrane of claim 12, wherein the amino acid salt comprises a glycinate salt, a sarcosinate salt, or an aminoisobutyrate salt.

15. The membrane of claim 3, wherein the amino compound comprises an amine-containing polymer.

16. The membrane of claim 2, wherein the graphene oxide has a carbon to oxygen ratio of from 3 to 20.

17. The membrane of claim 2, wherein the selective polymer layer comprises from 0.01% to 5% by weight graphene oxide, based on the total dry weight of the selective polymer layer.

18. The membrane of claim 1, wherein the selective polymer matrix has a $CO_2$:$H_2$ selectivity of at least 50 at 107° C. and 31.7 bar feed pressure.

19. A method for separating a first gas from a feed gas stream, the method comprising contacting a membrane defined by claim 1 with the feed gas stream comprising the first gas under conditions effective to afford transmembrane permeation of the first gas.

* * * * *